US010609010B2

(12) United States Patent
Letourneau et al.

(10) Patent No.: US 10,609,010 B2
(45) Date of Patent: Mar. 31, 2020

(54) SYSTEM, METHODS AND SOFTWARE APPLICATION FOR SENDING SECURED MESSAGES ON DECENTRALIZED NETWORKS

(71) Applicant: RAISTONE, INC., Los Angeles, CA (US)

(72) Inventors: Denis Letourneau, Los Angeles, CA (US); Adam A. Martin, Los Angeles, CA (US); Greta Geankoplis, Eugene, OR (US)

(73) Assignee: RAISTONE, INC., Los Angeles, CA (US)

( * ) Notice: Subject to any disclaimer, the term of this patent is extended or adjusted under 35 U.S.C. 154(b) by 145 days.

(21) Appl. No.: 15/601,720

(22) Filed: May 22, 2017

(65) Prior Publication Data

US 2018/0337904 A1  Nov. 22, 2018

(51) Int. Cl.
*H04L 29/06* (2006.01)
*H04L 9/08* (2006.01)
*H04L 9/32* (2006.01)
*H04L 9/30* (2006.01)

(52) U.S. Cl.
CPC .......... *H04L 63/065* (2013.01); *H04L 9/0866* (2013.01); *H04L 9/3239* (2013.01);
(Continued)

(58) Field of Classification Search
CPC ............... G06Q 20/065; G06Q 20/367; G06Q 20/3829; G06Q 2220/00; H04L 2209/38;
(Continued)

(56) References Cited

U.S. PATENT DOCUMENTS 9,258,117 B1 * 2/2016 Roth ..................... H04L 9/321
9,673,979 B1 * 6/2017 Poole ..................... H04L 9/16
(Continued)

OTHER PUBLICATIONS

Wuille, Pieter. "BIP 32: Hierarchical Deterministic Wallets." Version 9ce2c4d. Mar. 17, 2016. <https://github.com/bitcoin/bips/commit/9ce2c4d3516f9d9989e7536a0bfe2601d566e89ei>. pp. 1-10. (Year: 2016).*

(Continued)

*Primary Examiner* — Christopher Biagini
(74) *Attorney, Agent, or Firm* — Loza & Loza, LLP; Heidi L. Eisenhut

(57) ABSTRACT

Systems and methods of sending secured messages on decentralized networks are provided. A software application distributed and installed on a computer terminal that willing is able to participate in the system, where the computer terminal is interactively and dynamically connected to one or two decentralized peer-to-peer communication networks, using the Internet. One of the networks is used to advise about the presence of a message and the other is used to securely store the content of the messages. An alternative embodiment is to use only the decentralized storage system, if it can also acts as a Public Ledger network, with its native crypto-currency. The cryptographic keys of the first network are used to protect the content of the file and to derive where the messages will be stored on the decentralized storage network. In such networks, the transactions are handled by cryptographic mathematical algorithms, which are known to be identical across all users or participants of the same network.

2 Claims, 6 Drawing Sheets

(52) U.S. Cl.
CPC .......... *H04L 63/0428* (2013.01); *H04L 63/06* (2013.01); *H04L 63/123* (2013.01); *H04L 9/30* (2013.01); *H04L 2209/38* (2013.01)

(58) Field of Classification Search
CPC . H04L 2209/56; H04L 63/0428; H04L 63/06; H04L 63/061; H04L 63/065; H04L 63/123; H04L 67/104; H04L 9/0825; H04L 9/30
See application file for complete search history.

(56) References Cited

U.S. PATENT DOCUMENTS

| | | | | |
|---|---|---|---|---|
| 2003/0163697 | A1* | 8/2003 | Pabla | H04L 9/0838 713/171 |
| 2007/0250582 | A1* | 10/2007 | Sidhu | H04L 51/04 709/206 |
| 2016/0267472 | A1* | 9/2016 | Lingham | G06Q 20/3676 |
| 2017/0345011 | A1* | 11/2017 | Salami | G06Q 20/42 |

OTHER PUBLICATIONS

Palatinus et al. "BIP 43: Purpose Field for Deterministic Wallets." Version 4edd6d2. Feb. 3, 2016. <https://github.com/bitcoin/bips/commit/4edd6d2badd9a6ad2ff09bb6792fe0d0e365a7de>. pp. 1-2. (Year: 2016).*

Palatinus et al. "BIP 44: Multi-Account Hierarchy for Deterministic Wallets." Version 79679be. Mar. 10, 2016. <https://github.com/bitcoin/bips/commit/79679bee32d5b5cbd28ec39a14fd2b8061ca7f18>. pp. 1-4 (Year: 2016).*

Araoz et al. "BIP 45: Structure for Deterministic P2SH Multisignature Wallets." Version 4edd6d2. Feb. 3, 2016. <https://github.com/bitcoin/bips/commit/4edd6d2badd9a6ad2ff09bb6792fe0d0e365a7de>. pp. 1-5. (Year: 2016).*

Singleton, Andy. "Third Generation Blockchains—Big-time Trading, Messaging, and Ledgers." Sep. 8, 2015. <https://medium.com/@andysingleton/the-third-generation-of-blockchain-tech-will-mix-and-match-with-real-world-systems-93b6cc3b1eb9>. pp. 1-6. (Year: 2015).*

Singleton, Andy. "Applications and architecture for Blockhain-sttle Messaging." Sep. 8, 2015. <https://medium.com/@andysingleton/applications-and-architecture-for-blockchain-style-messaging-e609a1aa242d> pp. 1-8. (Year: 2015).*

Poon et al. "The Bitcoin Lightning Network: Scalable Off-Chain Instant Payments." Jan. 14, 2016. <https://lightning.network/lightning-network-paper.pdf> pp. 1-59. (Year: 2016).*

* cited by examiner

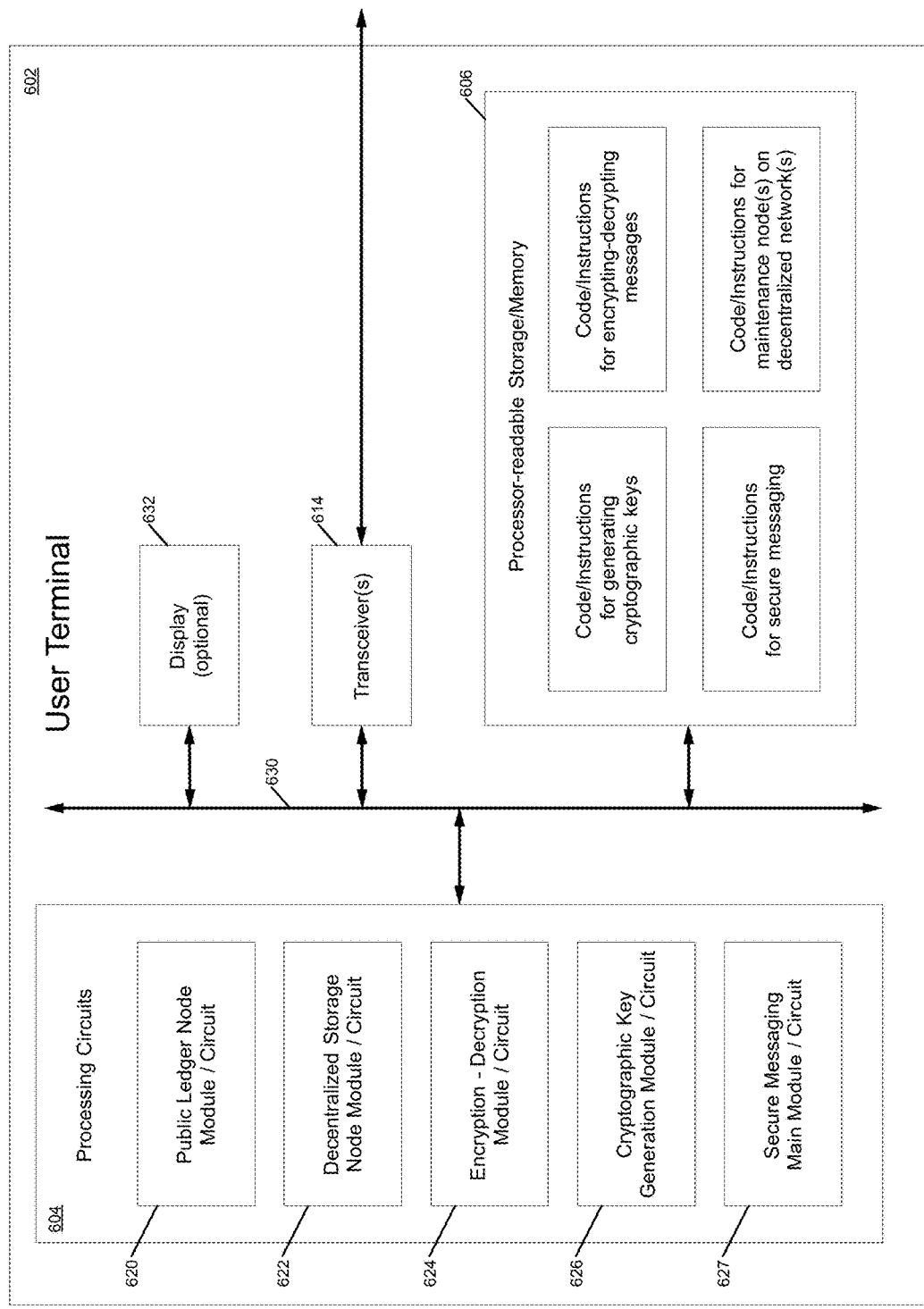

SYSTEM, METHODS AND SOFTWARE APPLICATION FOR SENDING SECURED MESSAGES ON DECENTRALIZED NETWORKS

FIELD

Various aspects of the present disclosure relate to peer-to-peer networking, and in particular to secure messaging using decentralized storage, software applications and systems conducting business processing using cryptography.

BACKGROUND

Most popular messaging tools used on the Internet do not offer end-to-end security. Furthermore, legacy messaging and back-office infrastructures, traditionally based on centralized, unencrypted hub-and-spoke database architecture, are expensive, inefficient, brittle, and are subject a single point of failure and to cyber-attack. The overhead cost of maintaining such architectures is also rising rapidly.

In view of the foregoing, what is needed are systems and methods for sending secured messages that are protected end-to-end, and that don't rely on centralized network architectures to be relayed to the users, but rather on decentralized networks with decentralized storage systems, as well as software applications and systems conducting business processing using cryptography.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a computer implemented method and software application for sending and storing secured messages on decentralized networks, is provided. The method uses cryptographic keys to encrypt/decrypt messages or documents, and also uses those keys as pointers for storing the messages or documents on independent decentralized storage systems. Peer-to-peer crypto-currency protocols are used as the relaying mechanism for some aspect of the message transmission. Hence, the system allows a network of distributed computer terminals to exchange secure messages and documents between themselves, without the need for centralized servers.

According to one feature, the method includes an anonymous computer terminal that communicates with a decentralized peer-to-peer Public Ledger network and registers a transaction on the ledger, with a short message. The short message is pointing to a larger message, which content may include copies of documents, and which is encrypted and stored separately on a distributed network of computers, allowing delayed retrieval of the message and its content. The sender and receiver computer terminals need not to be connected to the internet simultaneously to send or receive messages. The public ledger is maintained by a multitude of participating computers of a decentralized network, similar to the Bitcoin or Ethereum networks. Such a system allows everyone to be able to prove that a message has been sent from one user to another, but its content, along with the location where the message is stored, are encrypted and private.

According to another implementation, the encryption of the message could be performed with a key that is known to a plurality of individuals, allowing authorized third parties in possession of that key, to audit the related messages or documents.

The methods described herein, do not presume that the sender and receiver know each other, only the receiving destination information is required by the sender, which can be transmitted to the sender by a third party to the process, who is knowledgeable of the receiver information.

According to yet another aspect, a computer terminal for sending and receiving secure messages on decentralized networks is provided. The computer terminal includes a processing circuit; a communication interface communicatively coupled to the processing circuit for transmitting and receiving information; and a memory communicatively coupled to the processing circuit for storing information. The processing circuit is configured to send or receive electronic communications, which can be either simple or short messages, or have electronic documents attached to them. Both sending and receiving terminals are equipped with processing circuits to derive and handle cryptographic keys.

The methods described herein make extended use of more recent cryptographic techniques, such as the ones used by the Bitcoin network, specifically, the use of Hierarchical Deterministic cryptographic key generation and derivation, as defined by the Bitcoin Improvement Proposals #32, #43 and #44 (BIP32, BIP43 and BIP44). Those proposals define computer terminal functions that allow the derivation of a number of child cryptographic keys from a parent key. Those BIPs allow millions of cryptographic key pairs to be produced, for each derivation child, just by following a simple system.

The receiving computer terminal is configured to derive from a pair of master cryptographic keys (private and public), a Child Extended public key (CKD1), and this last key is transmitted, along with its associated derivation path to the message sender using existing methods of communication. Upon receipt of the receiver's Child Extended public key, the sending terminal derives two public keys from it.

The sending computer terminal is further configured to encrypt the message to be secured with the first public key, and to send the encrypted message to a location on the decentralized storage system that corresponds to the second public key. Finally, a token of the Public Ledger Network is injected by the sending computer terminal into the peer-to-peer network, with a destination address corresponding to the first public key derived; the token may imbeds the derivation path of the second public key, and may be encrypted with the first public key.

The receiving computer terminal is further configured to monitor the Public Ledger occasionally, and is notified that a message is available, by detecting that a token has been received. The computer terminal circuit, using the first private key, decrypt the short message imbedded into the token and the derivation path of the second key is determined. Once computed, the receiver computer terminal fetches the actual message, or documents, from the decentralized storage network, using the second key. When the message is retrieved, the computer terminal, uses the first private key, to decrypt it.

BRIEF DESCRIPTION OF THE DRAWINGS

FIG. 6 is a diagram illustrating an example of a hardware implementation of a processing circuit for a system configured to send secure messaging on a decentralized network, according to one aspect.

DETAILED DESCRIPTION

Figure 1:
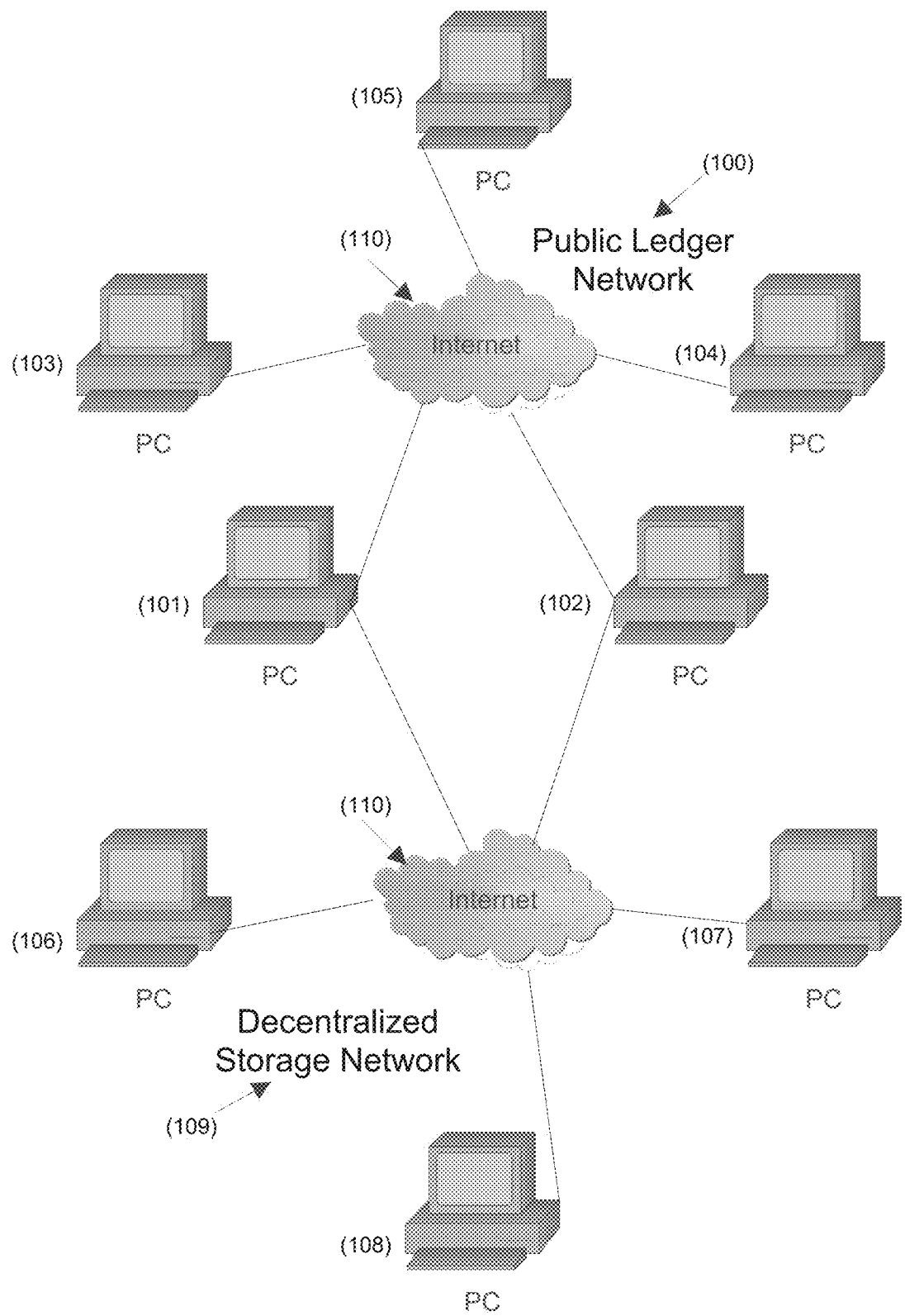
FIG. 1 illustrates an example of peer-to-peer decentralized communication networks, connecting a plurality of computers to a Public Ledger Network and a Decentralized Storage Network, for both of which the computer terminal software application is a participant, all using the Internet, according to one aspect.

The following detailed description is of the best currently contemplated modes of carrying out the invention. The description is not to be taken in a limiting sense, but is made merely for the purpose of illustrating the general principles of the invention. Furthermore, in the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation.

The term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another, even if they do not directly physically touch each other.

The term "message" is defined as a form of digitalized data, or a file including electronic data, a word, or many words, or an electronic document, or a folder with a plurality of files, and documents.

Various aspects are described herein in connection with a computer or a terminal, which can be a wired terminal (wired computer) or a wireless terminal (wireless computer). The term "computer", "terminal" or "computer terminal" may refer to any device or devices having at least one processing element and capable of carrying out a set of instructions such as arithmetic or logical operations. As used herein, the terms "computer", "terminal" or "computer terminal" may also be called, for example, a system, device, subscriber unit, subscriber station, mobile station, mobile, mobile device, remote station, remote terminal, access terminal, user terminal, communication device, user agent, user device, user equipment (UE), a Personal Computer (PC), a mobile computer, a laptop computer, a handheld computer, a notebook computer, a tablet computer, a wireless device, a mobile phone, a mobile communication device, a user communication device, personal digital assistant, mobile palm-held computer, a workstation, and/or a server.

The terms "electronic wallet" or "digital wallet" may refer to a file that contains a collection of private cryptographic keys secured on a computer, electronic device, or virtual container within an electronic device for storing information related to an electronic commerce transaction. The digital wallet is securely linked to the digital assets of a user. The assets, or tokens, are recorded on a distributed block chain ledger, and by the use of those cryptographic keys users are able to transfer the ownership of those assets.

The term "smart contract" may refer to computer protocols and code that facilitate, verify, or enforce the negotiation or performance of a contract, or that obviate the need for a contractual clause. Smart contracts typically utilize a user interface and often emulate the logic of a contractual clause. Smart contracts can be embedded on a network block chain, like Ethereum, and may be selectively executed by the nodes of the same network.

Throughout this disclosure, the use of the term "user" may refer to a consumer, a broker, a trader, a participant, a network participant, a party, a bidder, or any other individual or entity capable of performing a digital transaction or sending/receiving a message.

The term "blockchain" may refer to a distributed ledger that records peer-to-peer digital asset transactions such as Bitcoin or Ethereum transactions.

The various concepts presented throughout this disclosure may be implemented across a broad variety of telecommunication systems, network architectures, and communication standards.

Overview

System, methods and application software for sending secured messages on decentralized networks are provided.

According to an exemplary embodiment, FIG. 1 illustrates peer-to-peer decentralized communication networks, connecting a plurality of computers to a Public Ledger Network and/or a Decentralized Storage Network, all using the Internet, and for both of which computer terminal software applications allow participation in each networks. As shown, the communication network (100), the Public Ledger Network, may include a plurality of computer terminals (101 to 105), via a communication network like the internet (110). Such network is similar to the Bitcoin or Ethereum network.

Similarly, the Decentralized Storage communication network (109) may include a plurality of computer terminals (101, 102, and 106 to 108), via a communication network like the internet. Such network is similar to the Sia, Storj or the Syndicate network.

The preferred embodiment of the invention is a software application distributed and installed on a plurality of computer terminals or mobile computing devices that are participants of both networks. The software application need not be installed on all the computer terminals that are participants of both networks, but only on those who wants to participate in the secure messaging system. The computer terminals with the software application are able to participate in the system, where each computer terminal is interactively and dynamically connected to a multitude of other computer terminals in a peer-to-peer fashion.

Figure 3:
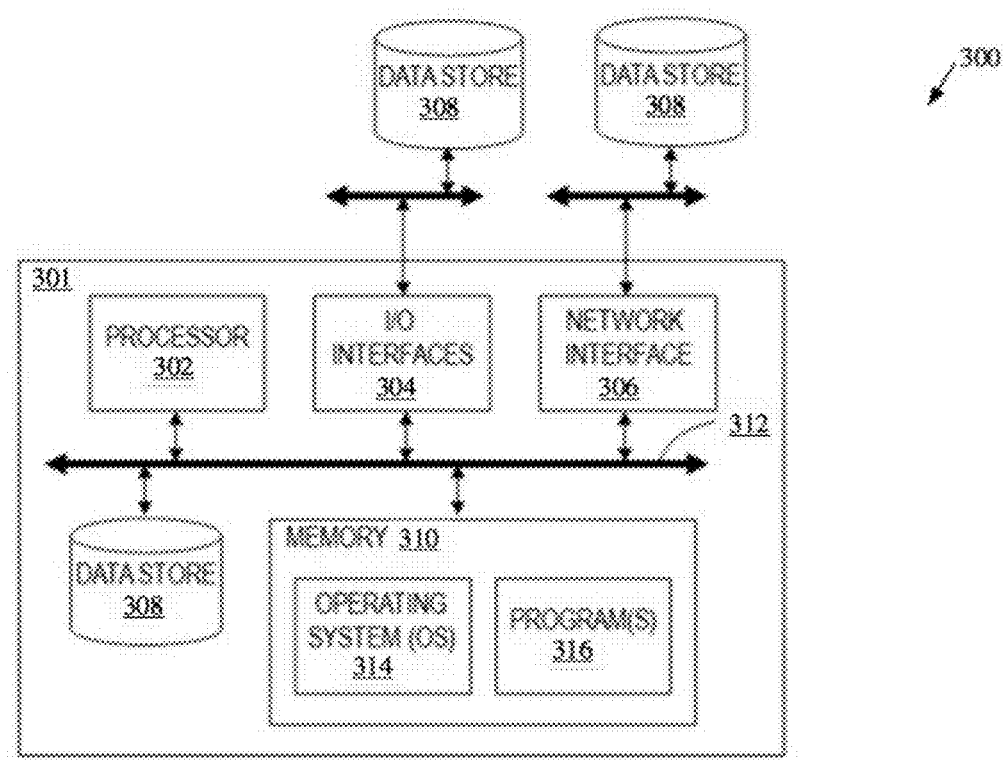
FIG. 3 is a diagram illustrating an example of a hardware implementation of a processing circuit for a system configured to send and receive secure messages or documents, according to one aspect.

FIG. 3, in an exemplary embodiment, a block diagram (300) illustrates such computer terminals (101 to 108), which may be used in the system, other systems, or stand-alone. This computer may be a digital computer that, in terms of hardware architecture, generally includes a processor (302), input/output (I/O) interfaces (304), a network interface (306), a data store (308), and memory (310). It should be appreciated by those of ordinary skill in the art that FIG. 3 depicts the computer (300) in an oversimplified manner, and a practical embodiment may include additional components and suitably configured processing logic to support known or conventional operating features that are not described in detail herein. The components (302, 304, 306, 308, and 310) are communicatively coupled via a local interface (312). The local interface may be, for example but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The processor is a hardware device for executing software instructions. The processor may be any custom made or commercially available processor, a central processing unit (CPU), an auxiliary processor among several processors associated with the computer, a semiconductor-based microprocessor (in the form of a microchip or chip set), or generally any device for executing software instructions. When the computer is in operation, the processor is configured to execute software stored within the memory, to communicate data to and from the memory, and to generally control operations of the computer pursuant to the software instructions. The I/O interfaces may be used to receive user input from and/or for providing system output to one or more devices or components. User input may be provided via, for example, a keyboard, touch pad, touch screen, and/or a mouse. System output may be provided via a display device and a printer (not shown). I/O interfaces may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface may be used to enable the computer to communicate on a network, such as the Internet, a wide area network (WAN), a local area network (LAN), and the like, etc. The network interface may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the computer such as, for example, an internal hard drive connected to the local interface in the computer. Additionally in another embodiment, the data store may be located external to the computer such as, for example, an external hard drive connected to the I/O interfaces (e.g., SCSI or USB connection). In a further embodiment, the data store may be connected to the computer through a network, such as, for example, a network attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory may include one or more software programs, each of which includes an ordered listing of executable instructions for implementing logical functions. The software in the memory includes a suitable operating system (O/S) (314) and one or more programs (316). The operating system essentially controls the execution of other computer programs, such as the one or more programs, and provides scheduling, input-output control, file and data management, memory management, and communication control and related services. The programs may include various applications, add-ons, etc. configured to provide end user functionality with the mobile devices. For example, exemplary programs may include, but not limited to, a web browser, social networking applications, streaming media applications, games, mapping and location applications, electronic mail applications, financial applications, and the like. In a typical example, the end user typically uses one or more of the programs along with a network such as the system. The one or more programs may be configured to implement the various processes, algorithms, methods, techniques, etc. described herein.

Figure 5:
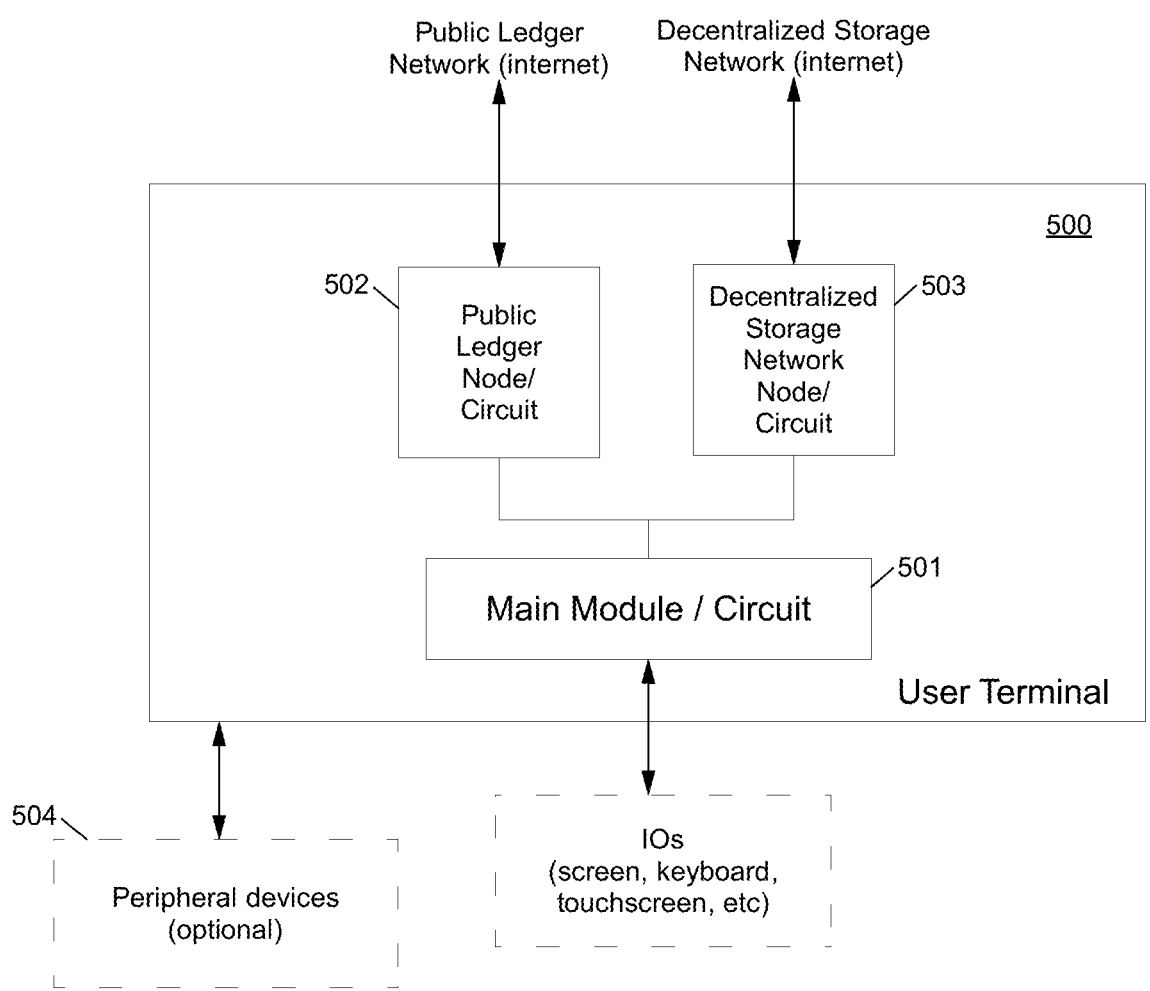
FIG. 5 is a block diagram illustrating the internal functional architecture of a computer system usable with one or more aspects of the systems and methods of the present disclosure.

FIG. 5 is a simplified block diagram illustrating the internal functional architecture of such a computer system program usable with one or more aspects of the systems and methods of the present disclosure. The user terminal (500), for example, user terminals 101 and 102 in FIG. 1, allows for a system user to send or receive messages, or documents.

As shown, the system to send secure messaging on de-centralized networks from the user terminal (500) may include a main module/circuit (501) for communicating with and providing instructions to a Public Ledger node/circuit (502) and to a Decentralized Storage Network node/circuit (503).

According to one aspect, the secure messaging program or system may optionally be located on a removable peripheral device (504), which may be communicatively coupled to the user terminal. Storing the secure messaging program or system on a removable peripheral device allows for the portability of the secure messaging program or system.

Methods

Figure 2:
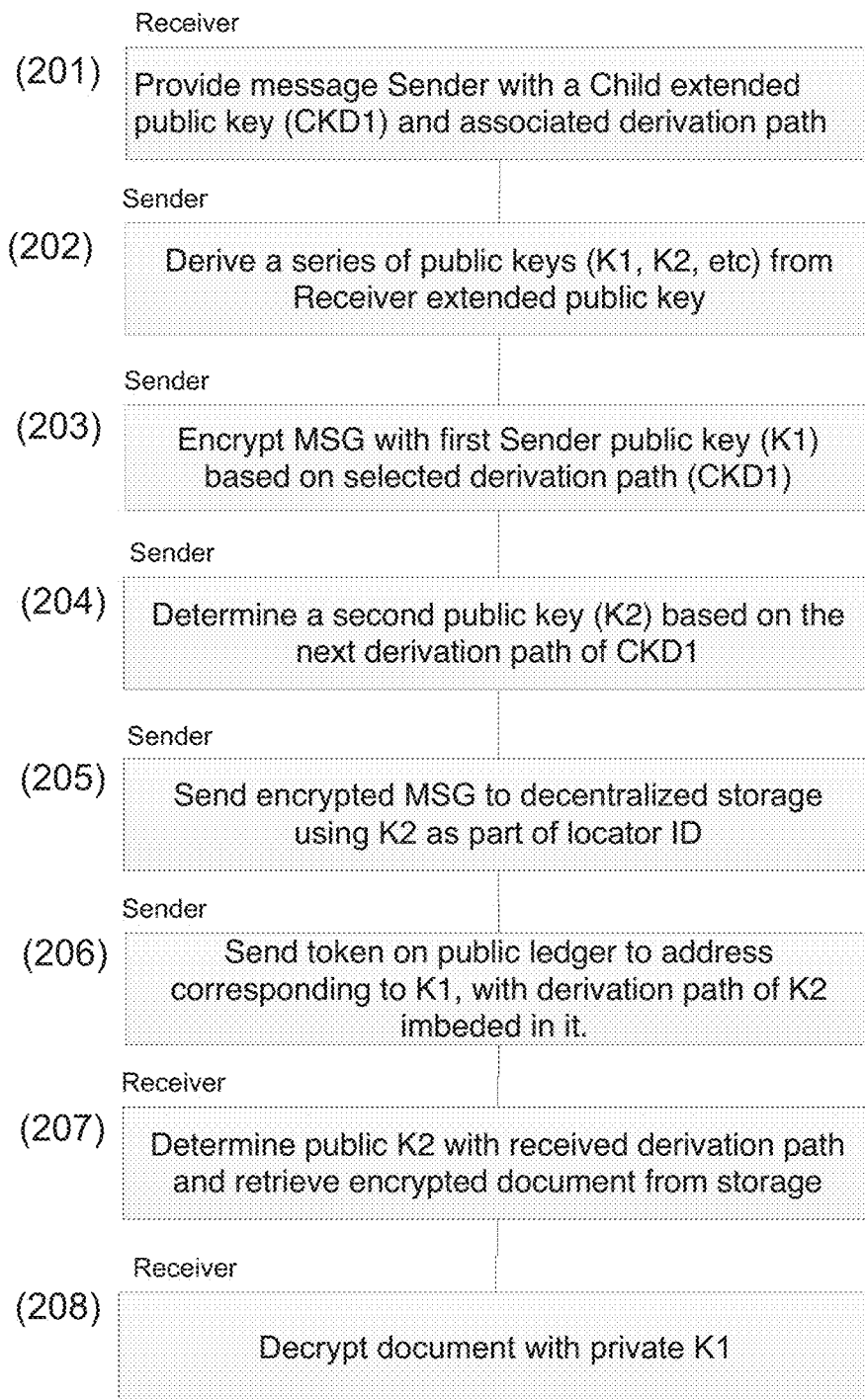
FIG. 2 is a simplified block diagram illustrating the steps of a method for sending secure messages and documents on decentralized networks, according to one aspect.

FIG. 2 is a simplified block diagram illustrating the steps of a method for sending secure messages and documents on decentralized networks, according to a preferred embodiment.

Figure 4:
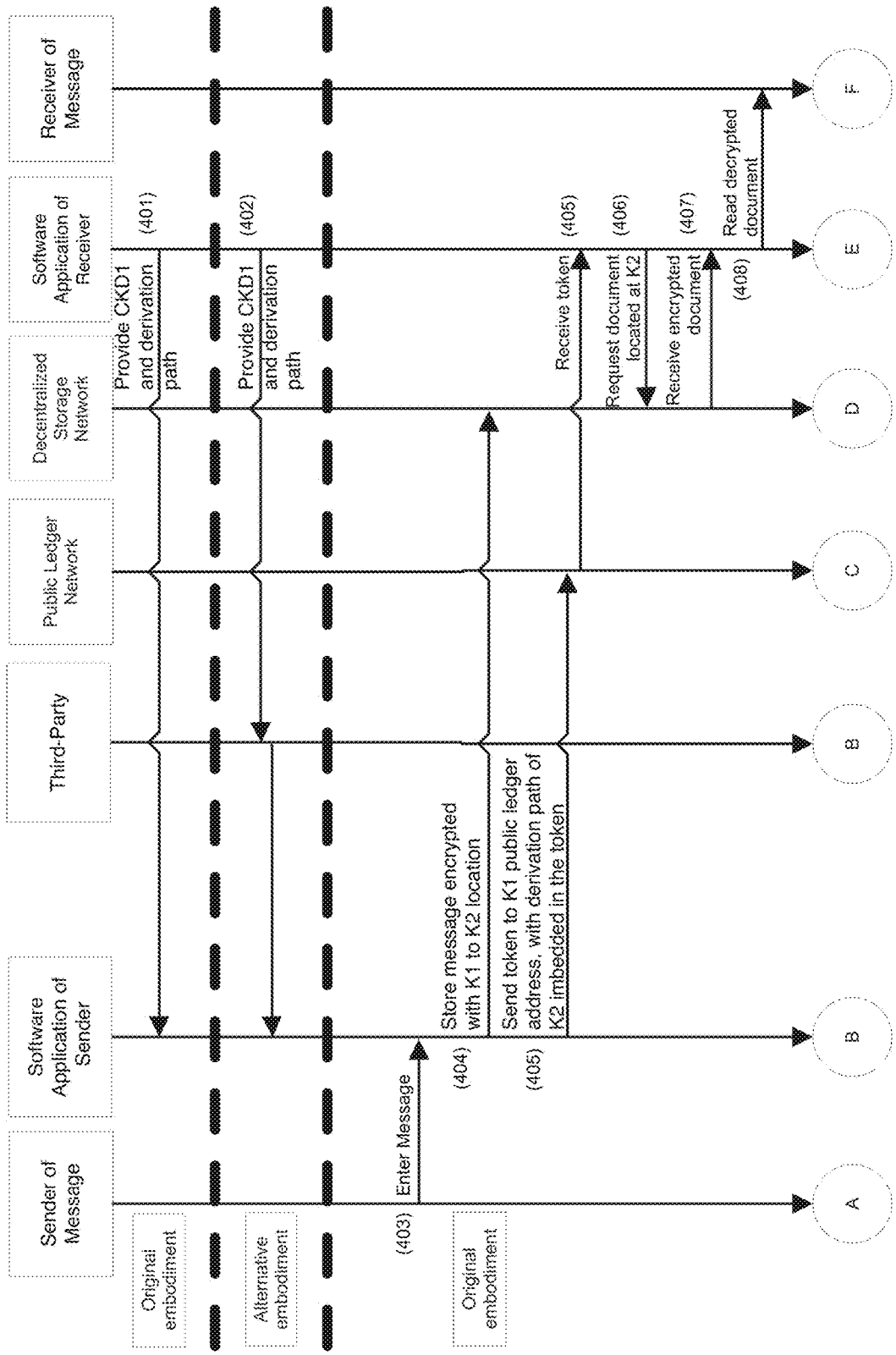
FIG. 4 is a flow diagram illustrating an example of a secure messaging system on decentralized networks, according to one aspect.

FIG. 4 is the flow diagram that illustrates the flow of information between the different participants of the system.

According to one aspect, a computer-implemented method for exchanging secure messages or documents where one or two distinct de-centralized peer-to-peer communication networks operating over the Internet may be used.

At first, a computer terminal, equipped with software that allows the generation of Hierarchical Cryptographic Deterministic Keys, creates a set of master keys (private and public) from master seed words, as per established standards, similar to the Bitcoin Improvement Proposal #32 (BIP32), and related Proposals BIP43, BIP44 and BIP45.

From the parent master public key a child extended public key is derived. As per BIP44, the derivation path may take the following format: m/purpose'/coin type'/account'/change/address_index, where the "purpose" is either the number 44 or 45 depending which BIP is referenced, the "coin type" is a number representing the crypto-currency used as the Public Ledger network. A standardized list of those numbers is maintained by SatoshiLabs, as part of SL Improvement Proposal #44 (SLIP44) which list, as an example, Bitcoin, which is allocated the number 0, Litecoin the number 2, and Dash the number 5. The "account" is a number that should be incrementally increased starting from 0. Different accounts may be assigned for each intended sender from which messages are expected to be received. The "change" is represented by a 1 if this derived address will be used as a change address, and finally the address_index number, incrementally increased from 0. As an example, following this standard, the first child extended public key (CKD1) derivation path may take the format m/44'/3'/0'/0. The child extended public key and corresponding derivation path are transmitted by the receiver to the message sender (201) and (401) of FIG. 2 and FIG. 4 respectively.

Alternatively, the receiver may send the extended public key and derivation to a third party, which will later send it to the message sender (402).

On the message sender's computer terminal upon receiving the extended public key from the receiver computer terminal, or third party, the software will further derive a series of public keys (K1, K2, K3, etc) (202 and 204). As an example, the derivation path may be m/44'/3'/0'/1 for K1, m/44'/3'/0'/2 for K2, and m/44'/3'/0'/3 for K3.

On the sender's computer terminal, the user inputs the message to be sent (403). The application software encrypts the message to send with the first public keys (K1) (203). The second public key derived (K2) is used to identify the storage address on a decentralized storage network. This second public key may be the next consecutive key based on the derivation path of key K1, or it may follow a random order.

The decentralized storage networks are supported by a plurality of individual computer terminals that have chosen to share spare memory storage on their computers and make this digital storage available on the network by the use of specific application software. Those users are usually rewarded financially for doing so, by the system. Those systems all have similar methods of operation, they essentially breakdown a message or document in a multitude of encrypted fragments (shards) and store those fragments on a multitude of network computer terminals. The storage contracts are administered by the network, and with redundancy between computer terminals, to prevent a single point-of-failure. Such systems allow for a highly decentralized, hack-resistant, and are overall, improved security solutions compared to centralized offerings. They also prevent anyone from gaining access to all the fragments, and from the computer terminals that store those fragments to read them. Only the computer terminals with the correct private cryptographic key may decrypt a file, once its fragments have been recalled from the storage system and put back together.

The message sender submits the message to the decentralized storage network, using receiver's public key K2 as the location identifier on the network (205) (404).

Using a public ledger network associated with the CKD1 key, the sender sends a small amount of crypto-currency to the public address corresponding to the public key K1 of the receiver (206) (405). Imbedded within the transaction, the encrypted derivation path used for K2, using K1 to encrypt.

This transaction indicates to the receiver that a message is waiting to be downloaded from the decentralized storage network. From the derivation path, the receiver verifies and derives the associated public key (K2) and retrieves the message from the decentralized storage network (207)(405) (406). The receiver then decrypts the message with the private key corresponding to the public key (K1) (208)(408).

In an alternate embodiment, to allow authorized third-parties to audit messages sent between participants, multi-signature addresses may be created. For example, multi-signature addresses may be created where two parties, the receiver and an authorized auditor, may monitor the transactions, and either one of the two private keys of the multi-signature address is required to decrypt a document. The procedure to create those special addresses is detailed in the BIP45 standard. In summary, all participants in the multi-signature arrangement generate their own Master Private Key and they share with each other the corresponding Master Public Key, or any Child Extended Public Key (CKD1'). Then, the rest of the messaging system functions as previously described. By using this embodiment, both the third-party and the original receiver, have access to the content and location of the messages and/or documents.

In an alternate situation, where a third party knows both the sender and receiver, but the sender and receiver want to remain anonymous with each other, an alternate embodiment may facilitate messaging between them. For this method, the receiver may provide the third party with a child extended public key (CKD1) and associated derivation path. The third party informs the sender of the receiver's CKD1 key and associated derivation path (402). Then, the rest of the messaging system functions as previously described.

Another alternate embodiment, may allow individual public keys (K1 and/or K2) to be sent in lieu of the child extended public key (CKD1) at (201-202), (401) or (402).

A yet another embodiment, to prevent the token transactions to be listed permanently on the Public Ledger, a lighting network channel could be open between the sender and receiver, on networks that supports such feature. The messages would be exchanged in the same manner as described herein, with the difference that the Public Ledger would not record all the individual transactions.

FIG. 6 is a diagram illustrating an example of a hardware implementation of a processing circuit for a system configured to exchange secure messages using decentralized networks.

The terminal (602) may include processing circuits (604). The processing circuits may be implemented with a bus architecture, represented generally by the bus (630). The bus may include any number of interconnecting buses and bridges depending on the application and attributes of the processing circuits and overall design constraints. The bus may link together various circuits including one or more processors and/or hardware modules, processing circuits, and the processor-readable medium (606). The bus may also link various other circuits such as timing sources, peripherals, and power management circuits, which are well known in the art, and therefore, will not be described any further.

The processing circuits may be coupled to one or more communications interfaces or transceivers (614), which may be used for communications (receiving and transmitting data) with entities of a network.

The processing circuits may include one or more processors, communicatively coupled, responsible for general processing, including the execution of software stored on the processor-readable medium. For example, the processing circuits may include one or more processors deployed in terminals 101-108 of FIG. 1, and/or the terminal of FIG. 5, for example. The software, when executed by the one or more processors, causes the processing circuits to perform the various functions described supra for any particular terminal. The processor-readable medium may also be used for storing data that is manipulated by the processing circuits when executing software. The processing system further includes at least one of the modules (620, 622, 624, 626 and 627). The modules may be software modules running on the processing circuits, resident/stored in the processor-readable medium, one or more hardware modules coupled to the processing circuits or some combination thereof.

In one configuration, the user terminal may optionally include a display or touch screen (632) for receiving and displaying data to the consumer.

One or more of the components, steps, and/or functions illustrated in the figures may be rearranged and/or combined into a single component, step, or function or embodied in several components, steps, or functions without affecting the operation of the communication device having channel-specific signal insertion. Additional elements, components, steps, and/or functions may also be added without departing from the invention. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad application, and that this application is not be limited to the specific constructions and arrangements shown and described, since various other modifications may occur to those ordinarily skilled in the art.

The invention claimed is:

1. A method for sending secure messages on de-centralized networks, comprising the steps of:
    installing a secure messaging program on a plurality of user terminals, including a sender terminal and a receiver terminal;
    within an instance of the secure messaging program on the sender terminal:
        deriving a first public cryptographic key (K1) and a second public cryptographic key (K2) from a child extended public key of an intended message receiver,
        encrypting a message with the first public cryptographic key (K1),
        storing the encrypted message on a de-centralized data storage network at a location identified by the second public cryptographic key (K2), and
        broadcasting a transaction to an address identified by the first public cryptographic key (K1) on a peer-to-peer network, the transaction including a derivation path of the second public cryptographic key (K2); and
    within an instance of the secure messaging program on the receiver terminal:
        retrieving the encrypted message from the de-centralized data storage network using a private key corresponding to the first public cryptographic key (K1), and
        decrypting the encrypted message with the private key corresponding to the first public cryptographic key (K1).

2. The method of claim 1, wherein the storage data network and the peer-to-peer network are the same network.

* * * * *